United States Patent [19]
Grandcolas et al.

[11] Patent Number: 5,867,153
[45] Date of Patent: Feb. 2, 1999

[54] METHOD AND SYSTEM FOR AUTOMATICALLY HARMONIZING ACCESS TO A SOFTWARE APPLICATION PROGRAM VIA DIFFERENT ACCESS DEVICES

[75] Inventors: Michael L. Grandcolas, Santa Monica; Wendell W. Anthony, Brentwood; Patrick Law, Los Angeles; Leslie Moss, Los Angeles; Teresa A. Petach, Los Angeles; Peter Tompkins, Malibu, all of Calif.

[73] Assignee: Transaction Technology, Inc.

[21] Appl. No.: 741,121

[22] Filed: Oct. 30, 1996

[51] Int. Cl.$^6$ .............................. G06F 15/00; G06F 13/00
[52] U.S. Cl. ........................ 345/326; 345/962; 345/969; 395/653; 395/200.31; 395/200.47; 395/200.68
[58] Field of Search ................................... 345/326, 962, 345/969; 395/653, 200.31, 200.47, 200.68, 200.76

[56] References Cited

U.S. PATENT DOCUMENTS

| | | | |
|---|---|---|---|
| 4,365,315 | 12/1982 | Jamnik | 704/8 |
| 4,586,158 | 4/1986 | Brandle | 345/334 |
| 4,780,821 | 10/1988 | Crossley | 395/670 |
| 4,855,936 | 8/1989 | Casey et al. | 345/520 |
| 5,220,501 | 6/1993 | Lawlor et al. | 380/24 |
| 5,303,343 | 4/1994 | Ohya et al. | 395/200.76 |
| 5,404,524 | 4/1995 | Celi, Jr. | 395/652 |
| 5,517,635 | 5/1996 | Cross et al. | 395/500 |

Primary Examiner—Huynh Ba
Attorney, Agent, or Firm—George T. Marcou; Kilpatrick Stockton LLP

[57] ABSTRACT

A method and system automatically harmonizes access to a given software application program via different access devices. Through use of the method and system, a financial institution can provide access to a given application (such as, for example, automatic bill payment services) to customers using different access devices such web browsers, screen phones and personal computers. A single application program is all that needs to be written and maintained by the financial institution. Also, the method and system enables financial institutions to "leverage" existing programs because now the institution can automatically "project" its existing stock of program services unto new access devices—devices which may not have even existed at the time the program was created. By receiving information from the user via the user's access device, including information identifying the type of device being used and the application program the user wishes to access, the present invention solves these problems. The application program is then accessed and the information to be displayed to the user is identified. This information is automatically translated into a format which is compatible with the device, including its display, and sent to the device for display. The user, in turn, inputs information in response to the displayed information and this input information is automatically translated into a format which is compatible with the application program and is sent to the application program. The response generated by the application program is automatically translated to be compatible with the device and is sent to the device.

12 Claims, 17 Drawing Sheets

FIG. 10

| TOKEN TYPE | | WINDOW MENU BAR | WINDOW TITLE | WINDOW MENU | WINDOW MENU ITEM | GROUP | TEXT FIELD | TABLE | TABLE HEADER ITEM | TABLE DATA ITEM | TABLE ROW DELIMITER | LIST | LIST ITEM | BUTTON | IMAGE |
|---|---|---|---|---|---|---|---|---|---|---|---|---|---|---|---|
| SCREEN | MAY CONTAIN | 1 ONLY | 1 ONLY | | | X | X | X | | | | X | | X | X |
| DIALOG | MAY CONTAIN | | 1 ONLY | | | X | X | X | | | | X | | X | X |
| WINDOW MENU BAR | MAY CONTAIN | | | X | | | | | | | | | | | |
| WINDOW MENU | MAY CONTAIN | | | | X | | | | | | | | | | |
| GROUP | MAY CONTAIN | | | | | X | X | X | | | | X | | X | X |
| TEXT FIELD | MAY CONTAIN | | | | | | | | | | | | | X | X |
| TABLE | MAY CONTAIN | | | | | | | | X | X | X | | | | |
| TABLE HEADER ITEM | MAY CONTAIN | | | | | | X | | | | | | | X | X |
| TABLE DATA ITEM | MAY CONTAIN | | | | | | X | | | | | | | X | X |
| LIST | MAY CONTAIN | | | | | | | | | | | | X | | |
| LIST ITEM | MAY CONTAIN | | | | | | X | | | | | | | X | X |
| FORCED BREAK | MAY BE USED IN | | | | | | X | | X | X | | | X | X | |
| CENTER | MAY MODIFY | | | | | | X | | X | X | | | X | X | X |
| LEFT | MAY MODIFY | | | | | | X | | X | X | | | X | X | X |
| RIGHT | MAY MODIFY | | | | | | X | | X | X | | | X | X | X |
| MONEY | MAY MODIFY | | | | | | X | | X | X | | | X | X | X |
| HIGHLIGHT | MAY MODIFY | | | | | | X | | X | X | | | X | X | X |

FIG. 11

| TAG | ATTRIBUTE | TEMPLATE | STREAM | FULL TAG | ABBREVIATION | DEFAULT | TERMINATED | NOTES |
|---|---|---|---|---|---|---|---|---|
| SCREEN | | X | X | <SCR...> OR <DLG...> | | | </SCR> OR </DLG> | DLG IS A DIALOG BOX |
| | ID | X | X | ID = name | | | | |
| | BACKGROUND | X | | BACKCOLOR = color | BC = color | | | |
| WINDOW TITLE | | X | X | <WTITLE...> | | | </WTITLE> | |
| | ID | X | X | ID = name | | | | |
| | MOVABLE | X | | MOVE = [Y\|N] | | Y | | |
| | SIZABLE | X | | SIZE = [Y\|N] | | Y | | |
| | CLOSABLE | X | | CLOSE = [Y\|N] | | Y | | |
| | TITLE TEXT | | X | | | | | |
| WINDOW MENU BAR | | X | X | <WMENU...> | | | | |
| | ID | X | X | ID = name | | | | |
| WINDOW MENU | | | X | <M...> | | | </M> | |
| | ID | | X | ID = name | | | | |
| | MENU TEXT | | X | | | | | |
| WINDOW MENU ITEM | | | X | <MI...> | | | </MI> | |
| | ID | | X | ID = name | | | | |
| | VALUE | | X | VALUE = n | | | | |
| | CHOICE ENABLED | | X | ENABLED = [TRUE\|FALSE] | EN = [T\|F] | T | | |
| | MENU ITEM TEXT | | X | | | | | |

FIG. 12

| TAG | ATTRIBUTE | TEMPLATE | STREAM | FULL TAG | ABBREVIATION | DEFAULT | TERMINATED | NOTES |
|---|---|---|---|---|---|---|---|---|
| GROUP | | X | X | <GROUP...> | | | | CONTAINER: WHAT ELEMENTS CAN BE CONTAINED NEEDS TO BE DEFINED |
| | ID | X | X | ID = name | | | | |
| | STYLE | | X | STYLE = known style | ST = style | | | MENU BAR, BLACKBOX OR TRANSPARANT |
| | SIZE/POSITION | X | X | X=nY=nH=nW=n | | | | |
| | OTHER ATTRIBUTES, BASED ON STYLE | | | | | | | |
| TEXT FIELD | | X | X | <TXT...> | | | </TXT> | |
| | ID | X | X | ID = name | | | | |
| | TEXT ALIGNMENT | | X | ALIGN=[LEFT\CENTER\RIGHT] | AL = [L\C\R] | LEFT | | |
| | SIZE/POSITION | X | | X=nY=nH=nW=n | | | | |
| | FONT STYLE | X | | FONT= font name | FN = font | | | |
| | FONT SIZE | X | | FONTSIZE = n | FS = n | | | |
| | FOREGROUND COLOR | X | | FORECOLOR = color | FC = color | | | |
| | BACKGROUND COLOR | X | | BACKCOLOR = color | BC = color | | | |
| | PHRASE PACK | | X | PP.LONG = text data | PP.L=text | | | PHRASE PACK IS A STRUCTURE CONTAINING THE VARIOUS TEXT RENDERINGS ASSOCIATED WITH THE BUTTON |
| TABLE | | X | X | <TABLE...> | | | </TABLE> | |
| | ID | X | X | ID = name | | | | |
| | SIZE/POSITION | X | | X=nY=nH=nW=n | | | | |
| | NUMBER OF COLUMNS | | X | NUMCOLS = n | NC = n | PER DATA | | IF NOT SPECIFIED, THESE ARE SET BY RENDERER |
| | NUMBER OF ROWS | | X | NUMROWS = n | NR = n | PER DATA | | IF NOT SPECIFIED, THESE ARE SET BY RENDERER |

FIG. 13

| TAG | ATTRIBUTE | TEMPLATE | STREAM | FULL TAG | ABBREVIATION | DEFAULT | TERMINATED | NOTES |
|---|---|---|---|---|---|---|---|---|
| TABLE HEADER | | | X | < TH...> | | | <TH>, <TD>, <TR>, OR </TABLE> | HEADER INFO. (BOLD) |
| | COLUMN SPAN | | X | COLSPAN = n | | 1 | | |
| | ROW SPAN | | X | ROWSPAN = n | | 1 | | |
| | ALIGNMENT | | X | ALIGN=[LEFT\CENTER\RIGHT] | AL = [L\C\R] | CENTER | | |
| | TABLE TEXT | | X | | | | | |
| TABLE DATA | | | X | < TD...> | | | <TH>, <TD>, <TR>, OR </TABLE> | |
| | COLUMN SPAN | | X | COLSPAN = n | | 1 | | |
| | ROW SPAN | | X | ROWSPAN = n | | 1 | | |
| | ALIGNMENT | | X | ALIGN=[LEFT\CENTER\RIGHT] | AL = [L\C\R] | CENTER | | |
| | TABLE TEXT | | X | | | | | |
| TABLE ROW | | | X | < TR > | | | | TERMINATES ROW |
| LIST | | | X | < LIST > | | | < /LIST > | |
| | ID | X | | | | | | |
| | SIZE /POSITION | X | X | X = n Y = n H = n W = n | | | | |
| | LIST TYPE | | X | | | | | |
| | OTHER ATTRIBUTES, DEPENDENT ON TYPE | | | | | | | |
| LIST ITEM | | | | < LI > | | | | |
| | VALUE | | X | VALUE = val | V = x | | | |
| | SELECTED | | X | SELECTED = [YES\NO] | SE = [Y\N] | NO | | |
| | LIST ITEM PHRASE PACK | | X | PP. LONG = text data | PP. L = text | | | LONG OR SHORT FORMS |

FIG. 14

| TAG / ATTRIBUTE | TEMPLATE | STREAM | FULL TAG | ABBREVIATION | DEFAULT | TERMINATED | NOTES |
|---|---|---|---|---|---|---|---|
| CHOICE | X |  | <BTN...> |  |  | <CH...> |  |
| ID | X | X | ID = name |  |  |  |  |
| VALUE |  | X | VAL = character | V = char |  |  |  |
| HOT KEY | X |  | HOTKEY = key | HK = char |  |  |  |
| STYLE |  | X | STYLE = known style | ST = style |  |  | EXIT, CAT BUTTON, MENU BUTTON, TEXT BUTTON, ICON BUTTON... |
| ALIGNMENT |  | X | ALIGN = [LEFT\|CENTER\|RIGHT] | AL = [L\|C\|R] | LEFT |  |  |
| SELECTED |  | X | SELECTED = [YES\|NO] | SE = [Y\|N] | NO |  |  |
| ENABLED |  | X | ENABLED = [TRUE\|FALSE] | EN = [T\|F] | TRUE |  |  |
| SIZE/POSITION | X |  | X = n Y = n H = n W = n |  |  |  |  |
| ACTION |  | X | ACTION = [SUBMIT\|SELECT\|NXTFLD] | ACT = [SUB\|SEL\|NXT] | SUBMIT |  |  |
| BUTTON PHRASE PACK |  | X |  |  |  |  |  |
| BUTTON IMAGE |  | X | BIMG = image file |  |  |  | ONLY FOR ICONBTN |
| ADSI SOFT KEY |  | X | SOFTKEY = [TRUE\|FALSE] | SOFT = [T\|F] | FALSE |  | CHOICE SHOULD BE MAPPED TO SOFT KEY |
| VIRTUAL TERMINAL WINDOW |  |  | DETAILS TBD |  |  |  |  |
| ID | X | X |  |  |  |  |  |
| TYPE/PROTOCOL | X |  |  |  |  |  |  |
| SIZE/POSITION | X |  |  |  |  |  |  |
| DATA |  | X |  |  |  |  |  |
| IMAGE |  |  | <IMG...> |  |  |  |  |
| ID | X | X | ID = name |  |  |  |  |
| SIZE/POSITION | X |  | X = n Y = n H = n W = n |  |  |  |  |
| IMAGE FILE |  | X | SRC = image file |  |  |  |  |

FIG. 15

| TAG | ATTRIBUTE | TEMPLATE | STREAM | FULL TAG | ABBREVIATION | DEFAULT | TERMINATED | NOTES |
|---|---|---|---|---|---|---|---|---|
| INPUT | | | | <INPUT...> | | | </INPUT> | |
| | ID | X | X | ID = name | | | | |
| | SIZE/POSITION | X | | X = n Y = n H = n W = n | | | | |
| | DATA TYPE | | X | TYPE = datatype | TY = dt | | | ALPHA,NUMERIC,PASSWORD, AMOUNT,ETC. |
| | MAXIMUM LENGTH | | X | MAXLEN = n | MAX = n | NONE | | |
| | MINIMUM LENGTH | | X | MINLEN = n | MIN = n | 0 | | |
| | TAB ORDER | | X | TABORDER = n | TAB = n | | | |
| STATUS BAR | | | X | | | | | |
| | ID | X | | | | | | |
| | OTHER TBD | X | | | | | | |
| FORCED LINE BREAK | | | X | <BR> | | | | |
| CENTER | | | X | <CENTER> | <C> | | </CENTER> OR </C> | MODIFIES ALIGNMENT |
| LEFT | | | X | <LEFT> | <L> | | </L> | MODIFIES ALIGNMENT |
| RIGHT | | | X | <RIGHT> | <R> | | </R> | MODIFIES ALIGNMENT |
| MONEY FORMAT | | | X | <$> | | | </$> | MODIFIES STYLE |
| HIGHLIGHT | | | X | <HL> | | | </HL> | MODIFIES STYLE |

METHOD AND SYSTEM FOR AUTOMATICALLY HARMONIZING ACCESS TO A SOFTWARE APPLICATION PROGRAM VIA DIFFERENT ACCESS DEVICES

BACKGROUND OF THE INFORMATION

Successful financial institutions recognize that their customers may wish to perform financial transactions, such as accessing their accounts, through a variety of different ways and at different times. For example, while in the past customers were required to visit their bank branches during office hours to make transactions, today sophisticated banks make their services available electronically on a 24-hour basis. A number of different electronic devices exist to access one's bank account to perform transactions, including an automated teller machine ("ATM"), a personal computer at a work or home location, a web browser on the internet or a screen phone. As technologies develop, other electronic mechanisms to access financial services will become available. The ability of financial institutions, including banks, to accommodate the ever-expanding host of access devices is an increasingly important part of getting and maintaining customers.

A major problem faced by a financial institution in accommodating the various access devices is assuring that the computer software program (also called "applications") made available to customers by the bank are compatible with the various devices used by the customers. For example, the protocols used to display information on an ATM may be different than the protocols used to display that information through a web browser on a user's personal computer. There may be different communications protocols for the displays of the devices and different encoding standards of the data, once the data gets to the display device. Traditionally, applications have been written so that they very tightly "couple" the sequence of the application with the actual encoding of the presentation of that application. Thus, new devices with different encoding standards and protocols have required that the application programs be rewritten.

Traditionally, financial institutions have responded to this problem by writing different versions of the same computer application, with each variation being compatible to a particular access device. thus, one version of a bill-paying program is written to be compatible with an ATM, another version of the same program is written to be compatible with a personal computer and yet another version of the same program is written to be compatible with a web browser on the internet.

Writing, maintaining and updating these different versions is expensive and time-consuming. Accordingly, there is a need for a system which makes a single version of an application program compatible with a number of different access devices.

An example of compatibility is making sure that all of the information to be displayed to the user is, in fact, displayed on the screen of the device being used. For example, when a relatively small screen display device is used, such as screens on screenphones, there may not be a great deal of space to display to the user the information and prompts required to run the program (for example, name of payee for bill payment, address of payee, etc.). In such an instance, abbreviations of phrases and the positioning of the icons, prompts and other information on the screen is readable ad intelligible by the user. Where larger screens are involved, such as personal computer screens or television screens, there is more space and in such an instance, larger phrasing and greater spacing between icons, prompts, ad other information is desirable. Thus, there is a need for a method and system to identify the type of screen being used and automatically customize the information to be displayed to the particular screen.

Further, because many banking programs were written some time ago, the devices originally intended for use with these programs may no longer be manufactured, due to replacement of the old devices with new devices. In such instances, the financial institution may be required to rewrite the application in order to use it al all on new devices. This is expensive and time-consuming. Accordingly, there is a need to make existing programs automatically compatible with new access devices.

SUMMARY OF THE INVENTION

These and other objects of the invention are achieved by the method and system described below. Specifically, the method and system described automatically harmonizes access to a given software application program via different access devices. Through use of the method and system, a financial institution can provide access to a given application (such as, for example, automatic bill payment services) to customers using different access devices such as web browsers, screen phones and personal computers. A single application program is all that needs to be written and maintained by the financial institution.

Also, the method and system enables financial institutions to "leverage" existing programs because now the institution can automatically "project" its existing stock of program services unto new access devices—devices which may not have even existed at the time the program was created.

The invention achieves these objectives by receiving information from the user via the user's access device, including information identifying the type of device being used and the application program the user wishes to access. The application program is then accessed and the information to be displayed to the user is identified. This information is automatically translated into a format which is compatible with the device, including its display, and sent to the device for display. The user, in turn, inputs information in response to the displayed information and this input information is automatically translated into a format which is compatible with the application program and is sent to the application program. The response generated by the application program is automatically translated to be compatible with the device and is sent to the device.

BRIEF DESCRIPTION OF THE DRAWINGS

FIGS. 7, 8, 9, 10 and 11 depict charts of the encoding tokens and token attributes.

FIG. 12 depicts an diagrammatic layout of the present invention.

FIG. 13 depicts the decision choices executed by the template hierarchy of FIG. 5.

FIG. 14 depicts an image of the present invention as may appear on a computer monitor.

FIG. 15 depicts a second image of the present invention as may appear on a computer monitor.

DETAILED DESCRIPTION

Figure 1:
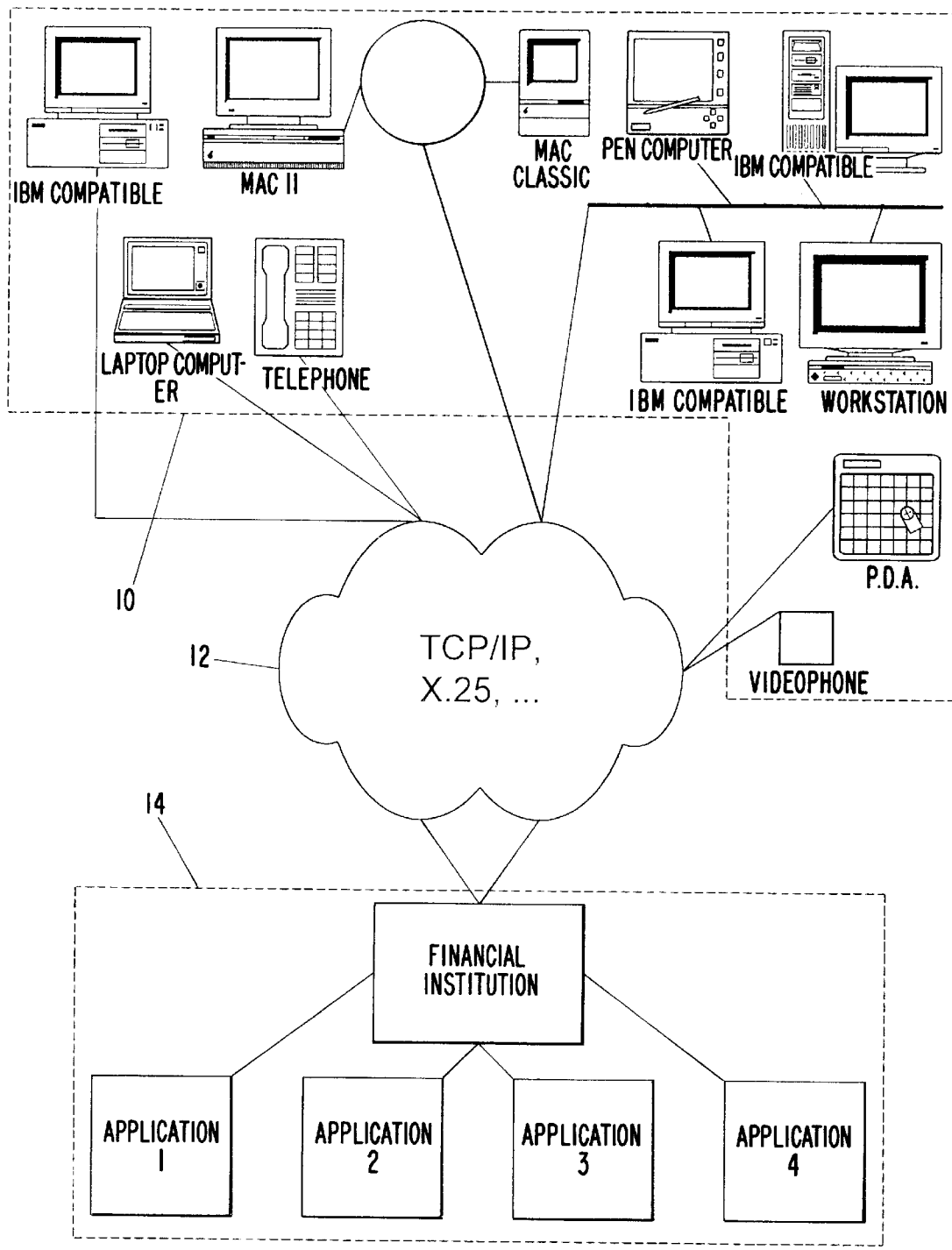
FIG. 1 depicts an overview of the present invention.

FIG. 1 depicts an overview of the present invention. As shown, the present invention includes a communication medium 12 providing the means for a plurality of customer devices 10 to communicate with a financial institution and its software applications 14. The various types of customer devices include but are not limited to solitary or networked Macintosh, DOS and Windows based personal and laptop computers; voice and screen telephones; and personal digital assistants.

Figure 2:
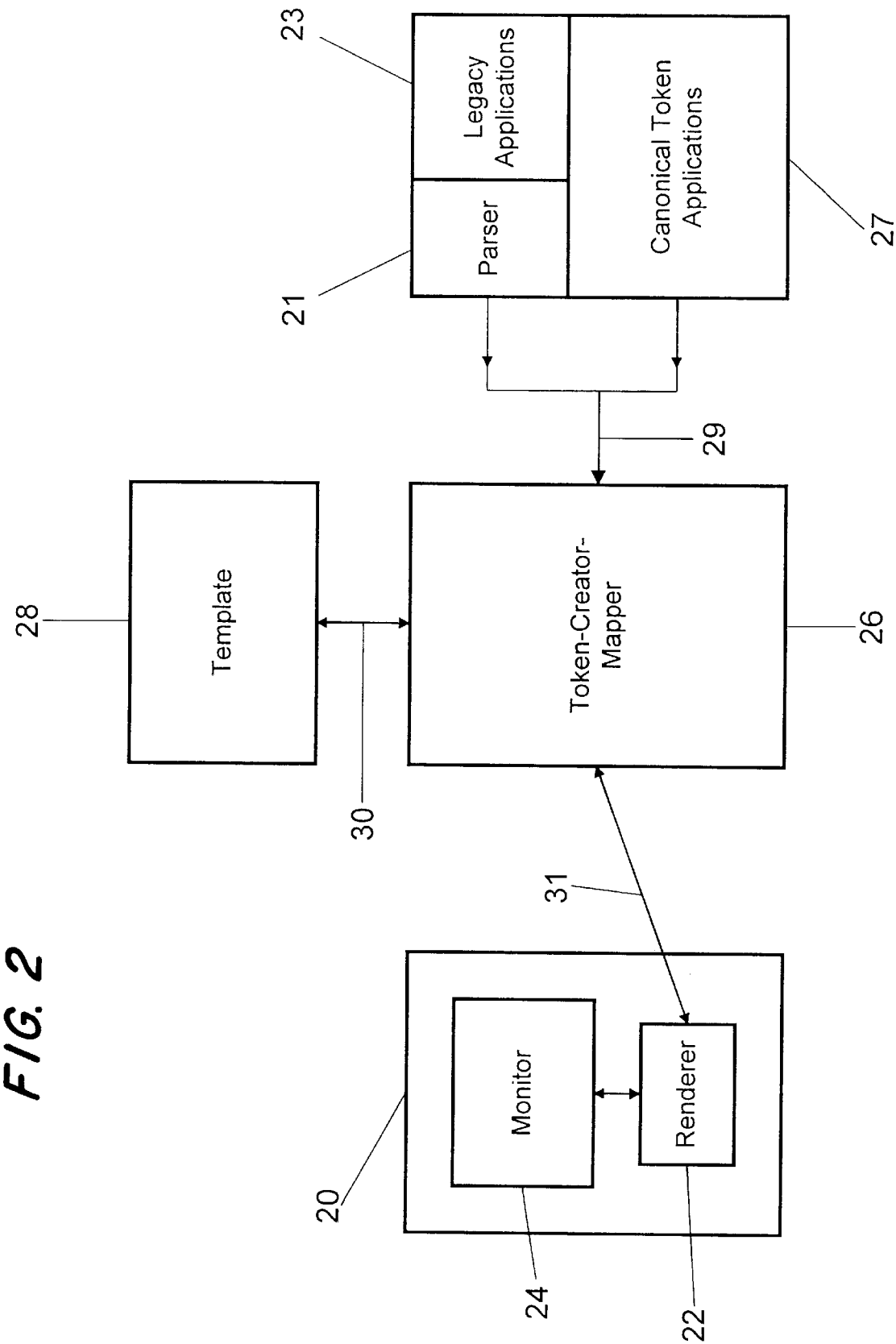
FIG. 2 depicts a detailed architectural overview of the present invention

FIG. 2 depicts a detailed architectural view of the present invention. A financial institution software application 23, 27 receives an initial communication from a customer's computer device 20. The initial communication will contain at a minimum customer identifying information including the customer device's language, business and device type. The application 23, 27 produces an application stream in response to the initial communication. Depending upon the nature of the application or application tools used, there are many potential forms of the application stream, including a Legacy application stream and a canonical token application stream.

A Legacy application stream contains data without any tokens. In order to be processed by a token-creator-mapper into a desired format for the customer's device, the application stream needs to contain tokens. A token or tag is a single element of an encoding language. For example, a token could be an input field, check box, or a choice. As used by the present invention, a token is an element of the electronic communication language used between the financial institution's application software and the token creator mapper. Therefore, by adding a token representation to an application stream en route to a customer, one is ensured that the application stream will be in a form comprehensible by the customer's computer system.

Where the financial institution Legacy application 23 puts forward a Legacy application stream, the stream is directed towards a parser 21. The parser 21 reads the Legacy application, determines that no token representation exists, and then adds a token representation or tokenizes the Legacy application stream. The now tokenized application stream is directed to the token-creator-mapper 26 along connecting line 29.

When the financial institution application puts forward a canonical token application stream 27, the stream by definition already contains a token representation and is no longer in need of the parser 21. The canonical token application stream is directed along connecting line 29 to the token-creator-mapper 26.

The present invention interfaces with a variety of financial institution applications that put forward a variety of application streams. Therefore, a variety of token-creator-mappers can be employed to map tokens within the variety of application streams. For purposes of illustration, a single token-creator-mapper is represented, although it is understood that a variety of token-creator-mappers can be used by the skilled artisan in place of the single element. All token-creator-mappers output a token stream that will be particular to a renderer used by the customer's device. Renderers are software components within computer systems that create two-dimensional representations of inputted token streams.

The token-creator-mapper 26 receives a tokenized application stream. The token-creator-mapper maps the application stream into a token representation that is understood by the customer device's renderer 22. The process of mapping is the transformation from one set to another or the making of a logical connection between two entities. Mapping is the process by which a first set of concepts is translated into a second set of concepts through a series of layers. Each layer contains the same amount of information as the layer above, but in a form somewhat closer to the form of the second concept. Eventually, after a series of layers, the first concept is translated into the second concept.

The particular renderer type and the appropriate token representation that is understood by the particular renderer is stored in a template data file 28. The template does not perform any processing, rather the template is referenced by the token-creator-mapper 26 during the process wherein the token-creator-mapper creates a token stream representation of the inputted application stream. The template is a data file that includes descriptions, lists of named tokens classified according to renderer type, and the style with which the application stream is to be presented on the customer device's monitor. In addition to use of a single template, the present invention may take advantage of a plurality of templates as may be envisioned by the skilled artisan. For purposes of illustration, one template is depicted. The template 28 allows the user of the present invention to modify the monitor screen layout of a financial institution application without actually altering the application or customer's device. The template 28 is referenced by the token-creator-mapper along connecting line 30. The template provides data as necessary for the token-creator-mapper to map an application stream to a customer's device screen requirements.

Upon the creation of a tokenized application stream, the tokenized stream is directed along connecting line 31 to the renderer 22 of the customer's device The renderer 22 decodes the tokenized stream and presents the information of the tokenized stream in a format and style specific way on the screen of the monitor 24. Examples of different types of renderers include the commercially available Netscape Navigator, Prodigy®, and ADSI, as well as custom renderers, such as Citibank's Direct Access, associated with Windows and DOS based personal computers, Macintosh systems, screen phones and personal digital assistants.

Netscape Navigator is a renderer for accessing, browsing and creating documents on the World Wide Web. Prodigy® is a renderer for accessing Prodigy®'s on-line content. ADSI is used in screen phone technology. Direct Access, which permits customers to perform banking functions from their home PC, is a custom renderer commercially available from a financial institution for accessing numerous financial institution applications.

Figure 3:
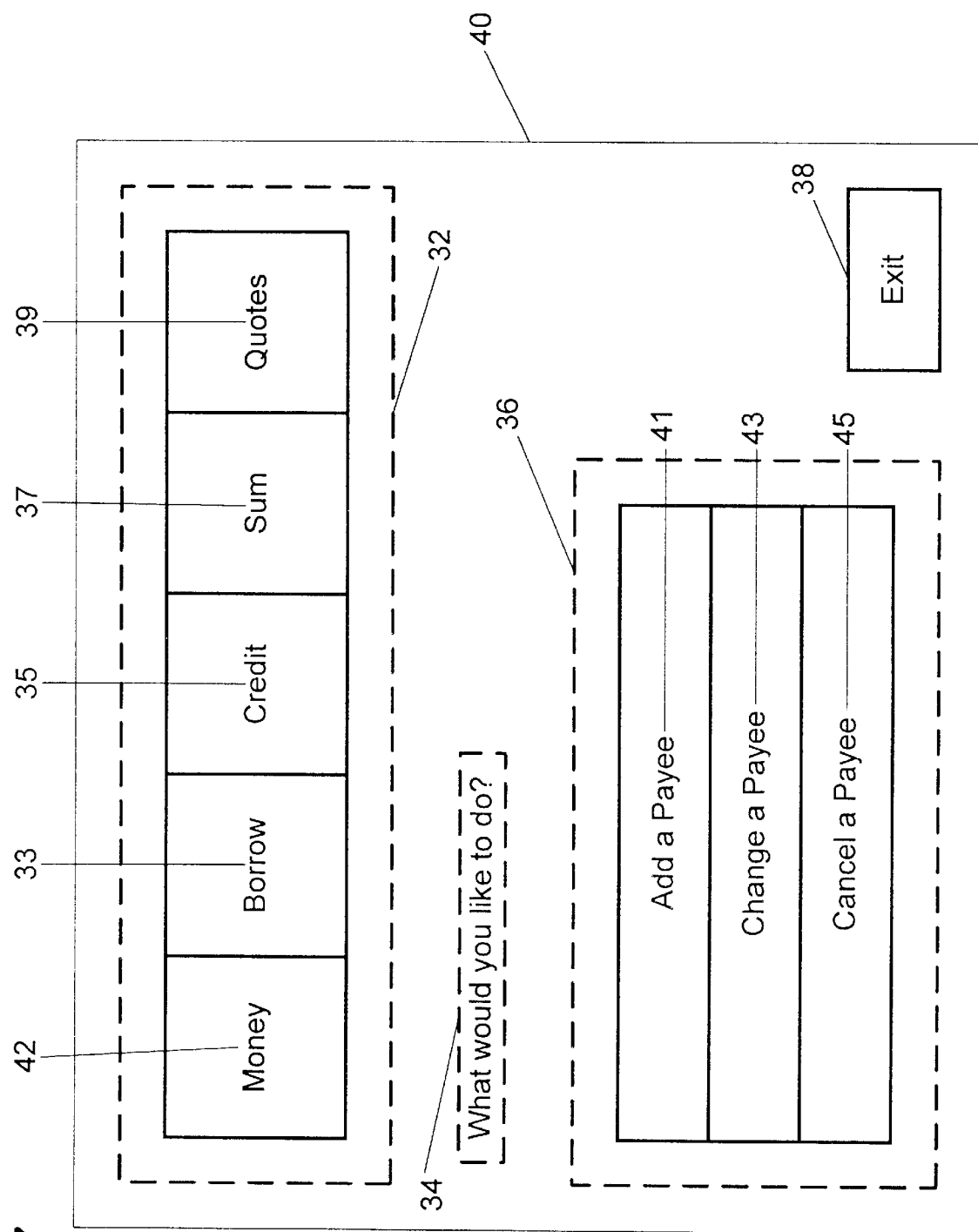
FIG. 3 depicts a representation of the present invention on computer monitor.
Figure 4:
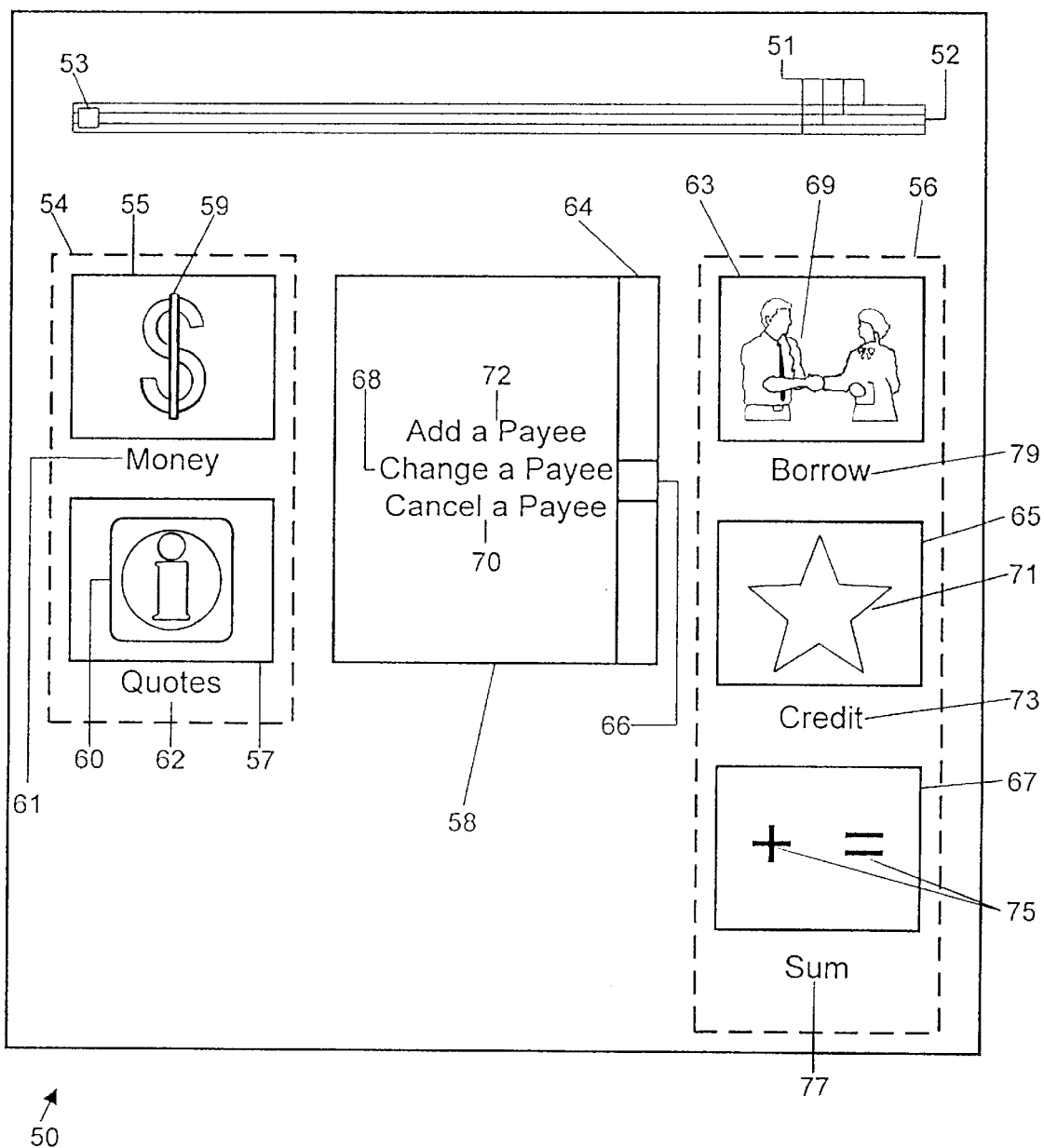
FIG. 4 depicts a second representation of the present invention on a computer monitor.

In addition to providing for device specific formatting, renderers provide means to change the overall style of a presentation. Examples of different presentations are set out in FIGS. 3 and 4. FIG. 3 depicts a screen layout that may be used by a customer with a renderer provided by a financial institution, while FIG. 4 depicts a screen layout that may be used by a customer with a renderer provided by a user of a custom renderer.

FIG. 3 depicts the screen layout set out by a renderer provided by a financial institution. As shown by the figure, a computer monitor screen 40 includes a row of buttons 32 along a top portion of the screen; querying text 34 located at the approximate middle of the screen below the row of buttons 32; a column of buttons 36 located below querying text 34; and a lone exit button 38 near the lower right-hand corner of the screen. The buttons present queries to the customer. The queries may be visual (as depicted in FIG. 3), verbal (as may be used with telephones, video phones, and the like) or any communication type medium suited for a question and response interface with an operator as may be envisioned by one skilled in the art.

The row of buttons 32 is shown, including five buttons. The five buttons include short phrases written thereon. The short phrases are intended to be queries and options for the customer to select. The queries and options refer to particular functions to potentially be performed by the application. The number of buttons and the queries set out thereon are a function of the template(s) and renderer, and can be manipulated in number and content, as will be discussed below, by one skilled in the art.

As depicted, the row of buttons 32 include five buttons with the following phrases (from left to right respectively): "Money", 42; "Borrow", 33; "Credit", 35; "Sum", 37; and "Quotes", 39. The text 34 includes the phrase, "What would you like to do?" prompting the customer to take action with regard to the buttons appearing on the screen. The column of buttons 36 include the following labels (from top to bottom respectively): "Add a Payee", 41; "Change a Payee", 43; and "Cancel a Payee", 45. The buttons may be activated by any means known to the skilled artisan including use of a keyboard, mouse, touch screen, and the like. Finally, the exit button when activated exits the screen.

FIG. 4 depicts a second type of screen format as may be presented by a custom renderer. As shown, a computer monitor 50 includes a top bar 52, a first column of buttons 54, a second column of buttons 56, and a scroll list 58.

The top bar includes horizontal lines 51 abutting a darkened square 53. The darkened square when enabled by the customer causes an exit from the screen. The first column 54 includes first and second buttons 55 and 57. Both buttons include symbols therein and descriptive phrases thereunder. The first button 55 offers balance inquiry and includes a dollar symbol 59 thereon and phrase "Money" 61 thereunder. Directly below the first button is second button 57 providing inquiry into financial or related quotes. Button 57 includes information symbol 60 thereon and the phrase "Quotes" 62 thereunder.

The second column of buttons 56 includes three buttons. From top to bottom, a first button 63 is an inquiry into borrowing money. Button 63 includes symbol 69 of two people shaking hands thereon and the phrase "Borrow" 79 thereunder. A second middle button 65 is an inquiry into financial credit. Button 65 includes a symbol 71 of a star thereon and phrase "Credit" 73 thereunder. A third button 67 is an inquiry into a financial sum. Button 67 includes a "+" and "=" symbol 75 thereon and the phrase "Sum" 77 thereunder.

Between the first and second columns is positioned box 58. Box 58 contains a list of items that may be selected by the customer. The items are depicted as phrases and include the following: "Add a Payee", 72; "Change a Payee", 68; and "Cancel a Payee", 70. The phrases may be scrolled by repositioning box 66 within column 64. The box may be repositioned by the customer using the computer keyboard, mouse, and the like.

The above screen layouts are accomplished by providing device-specific templates and minor content changes to edit icons. Certain customer devices have very limited screen space, resulting in the need to express phrases in short, concise structures. To provide numerous syntactic and format versions of a phrase, phrase packs are used.

Phrase packs may be used to label buttons, icons or portions of the monitor screen. For example, the phrase "Your Money in the Bank" may be resolved through a phrase dictionary (discussed below) or related mechanism to appear in a tokenized application stream as follows:

<BTN1 PP.L=Your Money in the Bank, PP.S=Money> wherein, BTN1 refers to a first button, PP.L refers to a long phrase and PP.S refers to a shortened version of the same phrase. The selection of which phrase to appear at a particular location on a designated monitor screen is a result of the control of the token-creator-mapper, device-specific template, and device-specific renderer. Phrase packs, like other elements located within the template data file, allow the user to alter the appearance of items on the monitor screen without altering the financial institution program or customer device. Phrase packs include a hierarchy that allow the user to select a language, style, business, device, and modal flexibility by manipulation of an appropriate level of the hierarchy. This hierarchy is set out in FIG. 5.

Figure 5:
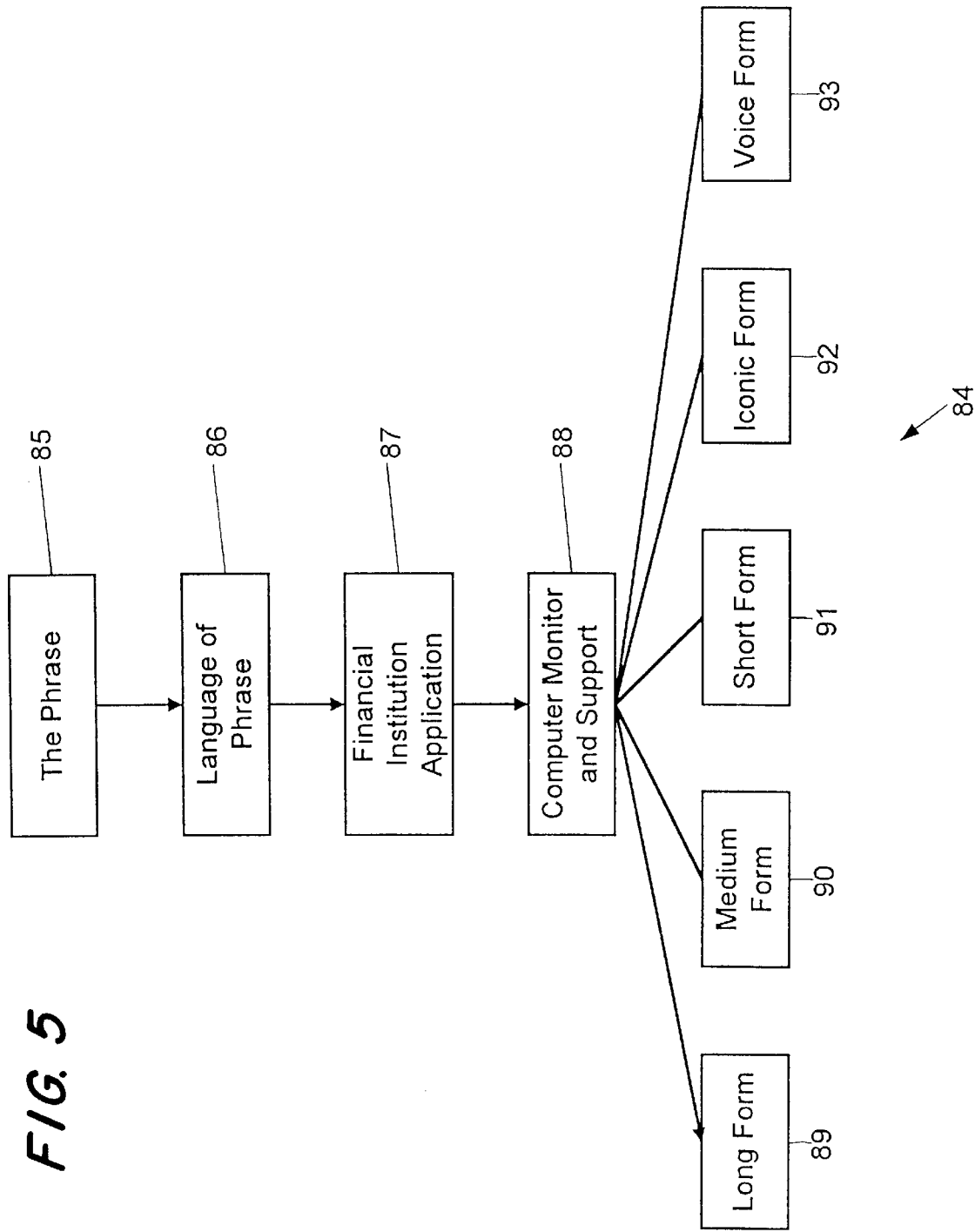
FIG. 5 depicts a hierarchy of a template selection.

The phrase packs include a hierarchy of importance 84 regarding functions and forms of the phrase. The hierarchy is depicted in FIG. 5, ranging in importance from top to bottom. At the top of the hierarchy is the phrase itself 85. For example, as discussed above, the phrase may include, "Your Money in the Bank". The second level in the hierarchy is the language of the phase 86. It is the intent of the present invention to reach as many people, in as many languages as possible, hence the language of the phrase is limited only by the design limitations of the skilled artisan. Therefore, the language of the phrase receives a high priority in the template hierarchy.

The third level of the hierarchy 87 is directed towards the identity of the financial institution application that the customer has selected to make use of. The identity of the financial institution application will dictate the tonality of the phrase to be presented to the customer.

The fourth level in the hierarchy of importance in the template data selection process is the computer monitor and support 88. This consideration will determine placement of icons, as well as the selection of long or short phrase packs from the template.

The following three considerations concern the length of the phrase: long form 89; medium form 90; and short form 91. The length of the phrase is determined by the type of renderer associated with a particular monitor screen type. The final two considerations include the actual presentation to the customer of the application. The eighth level 92 of the hierarchy is a consideration of the iconic form assigned and positioned on the computer monitor. The final consideration 93 is the voice form of a phrase pack or the like, as may be presented by the customer. After satisfying the levels of the hierarchy, an appropriate phrase pack satisfying the monitor screen real estate and display format (typed on a screen or spoken) will be selected either by manipulation of a remote agent or automatic function of the present invention.

The main menu of the screen as presented to the customer on the customer's monitor is a product of the application front end. The structure of the application front end is independent of the financial institution application and therefore can be modified to the particular needs of a financial institution allowing two different financial institutions to tailor the same application to their needs. The application front end is the location wherein specific icons and other menu items can be injected to tailor the application output presentation. All messages between the application and customer travel through the application front end. The application front end also allows for manipulation of functions of the applications including the paying of bills, transferring of monies and other tasks set upon the financial institution application. The architecture of the present invention with the inclusion of the application front end is depicted in FIG. 6.

Figure 6:
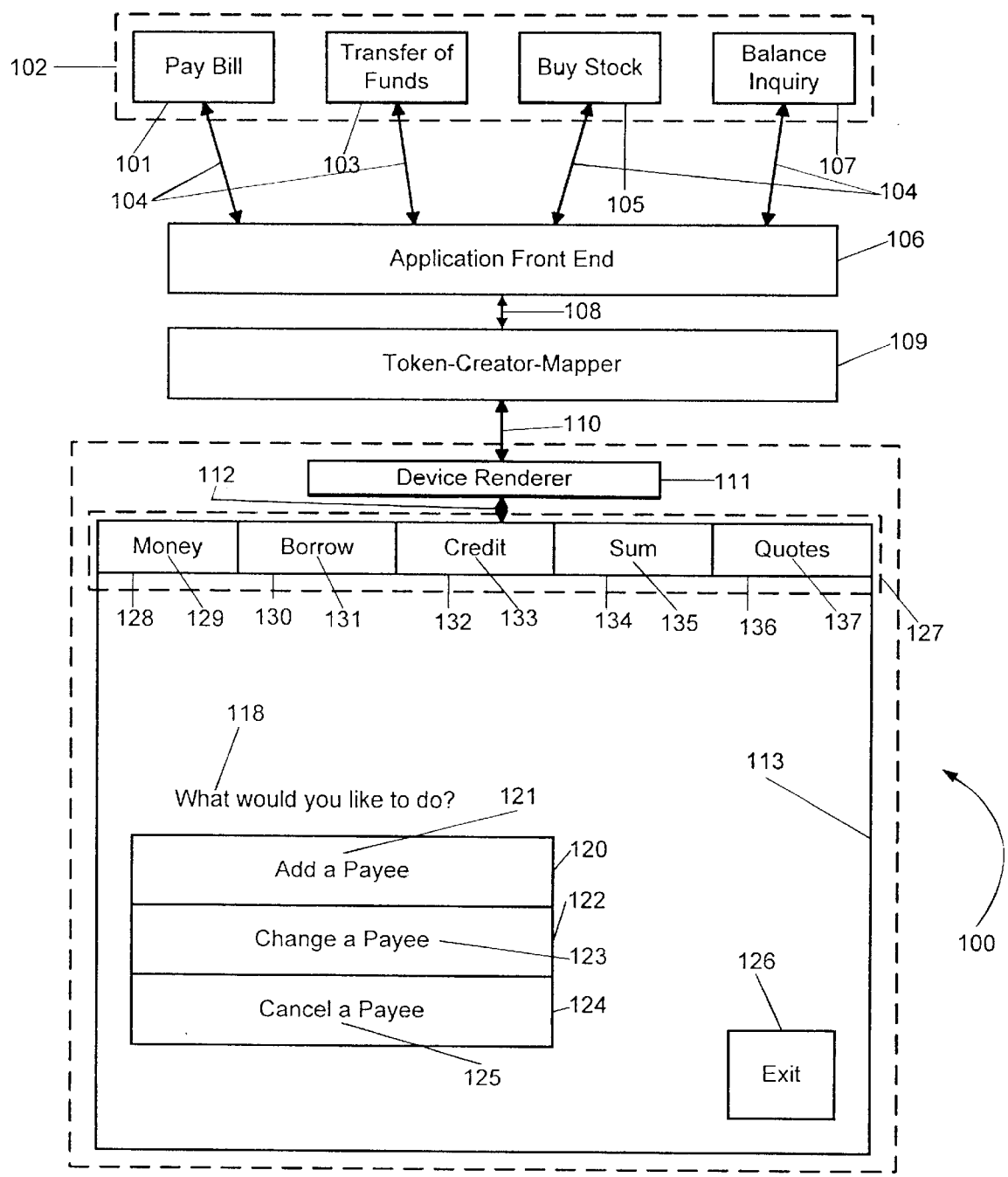
FIG. 6 depicts a chart of the hierarchy for combination of token attributes.

FIG. 6 depicts a detailed view of an architecture of the present invention 100. As shown by the figure from top to bottom, components of a financial institution application are set out in a top row 102. Row 102 contains four examples of numerous available application functions, including from left to right the following: a "Pay Bill" function 101; a "Transfer of Funds" function 103; a "Buy Stock" function 105; and a "Balance Inquiry" function 107. Functions within row 102 are in electrical connection with an application front end 106 as depicted by connecting lines 104.

The application front end 106 creates an application stream as will be discussed below with regard to FIG. 7. The application stream is directed along connecting line 108 to token-creator-mapper 109. The token-creator-mapper 109 operates as discussed above and directs the resulting token stream along connecting line 110 to a device renderer 111.

The device renderer 111 operates as discussed above and directs a screen image along connecting line 112 to the device monitor screen 113. Displayed on the device monitor screen 113 is the renderered token stream of the text appearing below.

1. <SCR T=A>
2. <TXT ID=T1 PP.L="What would you like to do?">
3. <BTN ID=BA V=A PP.L="Add a Payee">
4. <BTN ID=BB V=B PP.L="Change a Payee">
5. <BTN ID=BC V=C PP.L="Cancel a Payee">
6. <BTN ID=B1 V=1 PP.L="Your Money in the Bank", PP.S="Money">
7. <BTN ID=B2 V=2 PP.L="Borrowing and Loans", PP.S="Borrow">
8. <BTN ID=B3 V=3 PP.L="Credit Cards", PP.S="Credit">
9. <BTN ID=B4 V=4 PP.L="Summary and Services", PP.S="Sum">
10. <BTN ID=B5 V=5 PP.L="Quotes">
11. <BTN ID=B6 V=6 PP.L="Exit">

Line numbers have been added for purposes of discussion only and are not part of the tokenized text. Line 1 refers to a token designation wherein the initials "SCR" is the key word of the token for a template name and "T=A" refers to the template labeled "A" used to format the appearance of the screen. Line 2 includes the initials "TXT" referring to the token for text on the screen 113. The identity of the text is set out by the initials "ID=" with the name of the text being "T1". The identification is followed by a long phrase pack. The result of line 2 is shown by element 118 of FIG. 6. Lines 3 through 11 consist of four sets of token attributes and their assigned values. The first set of attributes define the nature of the insertion onto the customer's computer monitor including text phrase packs, icons, buttons or the like. The second set of attributes identifies the insertion. The second set is signified by the term "ID=" followed by some signifying indicia. The third set of attributes defines the value expected by the application to invoke selection of the identified option. The third set is identified by the attribute "V=" followed by a return value, such as an alphabetic or numeric option choice identifier. The fourth set of attributes sets out the phrase pack to be inserted. As detailed above, the phrase pack may be in a longer form, as is signified by the attribute "PP.L=" followed by the long phrase or set of words in quotes. The short form of the phrase pack is set out as "PP.S=" followed by the short phrase or set of words in quotes. Where the two forms are set out in one line, the two lengths of phrase packs are separated by a comma.

Line 3 assigns button bar 120 to the customer's screen as signified by the first set of attributes, "BTN". The button is identified by the label "BA" as indicated by the second set of attributes. The button will return the selection value of "A" to the application and includes long phrase pack, "Add a Payee" 121. Likewise, lines 4 and 5 refer to button bars 122 and 124, located directly below button 120, which read "Change a Payee" 123 and "Cancel a Payee" 125, respectively.

Lines 6 through 10 refer to a row of buttons 127 positioned along the top perimeter of the screen 113. Row 127 includes five buttons as indicated by the first variable of lines 6 through 10 reading "BTN". The buttons are identified by the second set of variables of "ID=B1; B2; B3; B4; B5", respectively. The application's expected selection values of the five buttons are indicated by the attribute "V=1; 2; 3; 4; 5", respectively. As depicted, first button 128 displays a short phrase pack "Money" 129; second button 130 displays short phrase pack "Borrow" 131; third button 132 displays the short phrase pack "Credit" 133; fourth button 134 displays short phrase pack "Sum" 135; and fifth button 136 displays short phrase pack "Quotes" 137. Finally, line 11 refers to exit button 126. When arranging the layout of the computer screen 113, the device renderer 111 in conjunction with a tokenized application stream uses elements found missing within the template to select and place items.

A closer examination of the interaction between the applications and the application front end follows. The examination will focus on the operation of the application front end with respect to receipt of a Legacy (no tokens) application and a Direct Access (canonical tokens) application.

Figure 7:
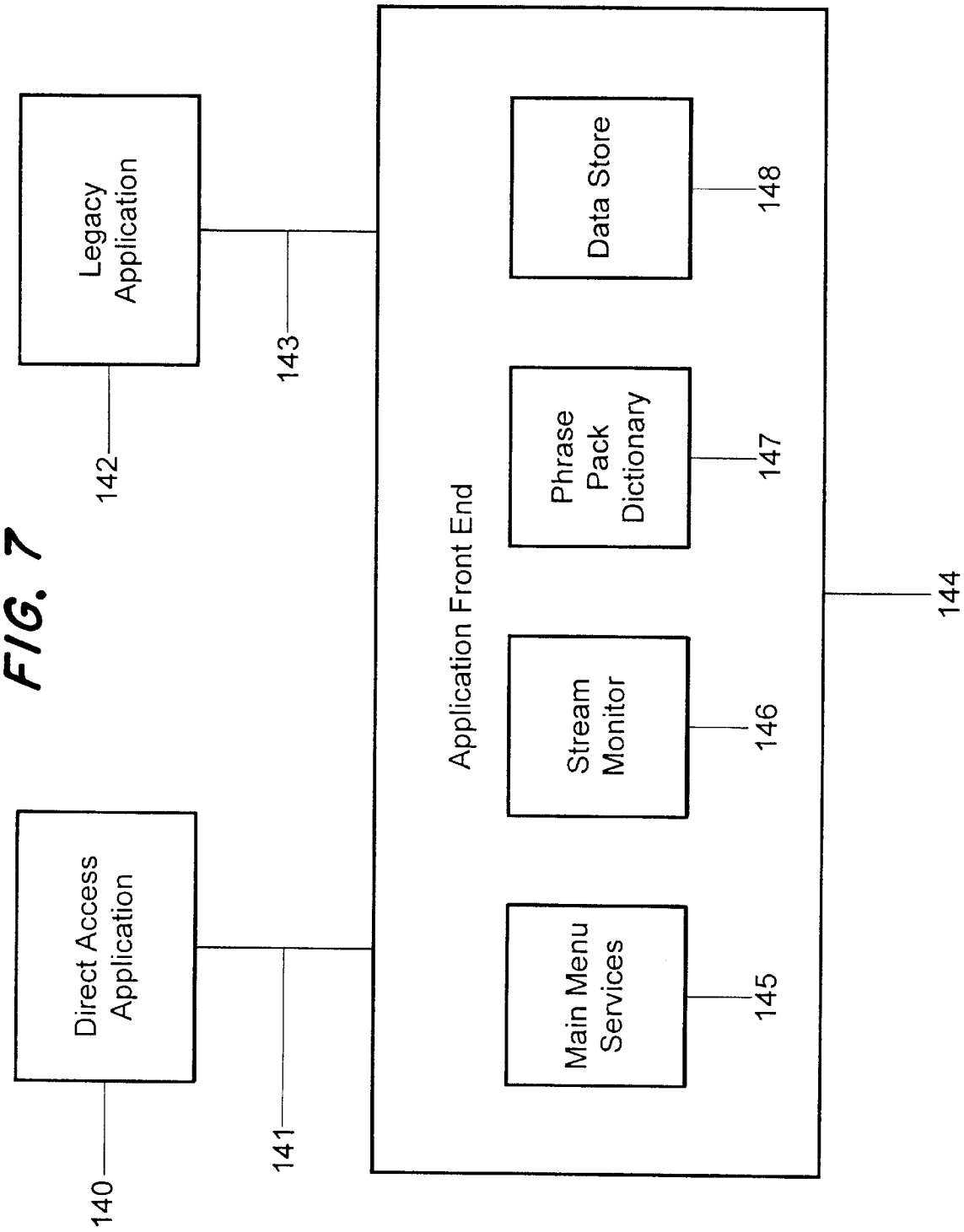

As depicted in FIG. 7, both Direct Access application 140 and Legacy application 142 direct their respective application streams along connecting lines 141 and 143, respectively, to the application front end 144. The application front end is divided into the following four parts: main menu services 145, stream monitor 146, phrase pack dictionary 147, and data store 148.

The Direct Access application stream supports several logical channels within it. One logical channel supports screen related output and customer related input. Other logical channels support such functions as uploading of scripts, downloading of customer information, bitmaps and templates. When the Direct Access application first receives customer identification information, the stream monitor component of the Direct Access application uses the identifying information to select appropriate top level menu components and phrases from the phrase packs dictionary.

The stream monitor 146 controls the functions of the application front end 144, including the functions of interpreting, normalizing and enhancing all input and output data streams. All input and output data streams pass through the stream monitor.

Different portions of a data stream are intended for different destinations, including messages to the customer's device, messages to the integrator, an application switch, a request for main menu services, references to the phrase pack dictionary and messages to the data store.

Messages to the customer's device are subject to editing by the stream monitor to include or exclude tokens related to the style of presentation including non-linear navigation (omnipresent menu buttons) and product-specific function and icon requirements. When the stream monitor detects the presence of a Legacy application, the stream monitor converts the Legacy application stream into a Direct Access application stream.

Messages to the integrator facilitate the integration process wherein a combination of diverse elements of hardware and software are put into a unified system. The presence of an application switch in an application stream passes control of the application stream to an appropriate financial institution software application function. In addition, omnipresent menus elections, activity codes and remote scripts or agents can trigger an application switch.

Omnipresent menu selections are menu selections that are available to the user throughout any portion of use of an application. In contrast, top level main menu selections are selections available to the user of an application only from a specific screen function, usually a top screen main menu. Examples of top level main menu services or functions include balance inquiries and transfer of funds.

The main menu services 145 are traversed when an appropriate section is received, until the selection triggers an application switch. Then the application switch "engages" the appropriate application function required for the selection made.

The phrase pack dictionary 147 supports multiple languages and language forms to supply requests for phrase packs. Composed as a database, the phrase pack dictionary requires at least the following primary data elements to locate the form of a given phrase: (in hierarchical order) language; business; and device type. In operation, the selection from the phrase pack dictionary takes the route depicted in FIG. 8.

Figure 8:
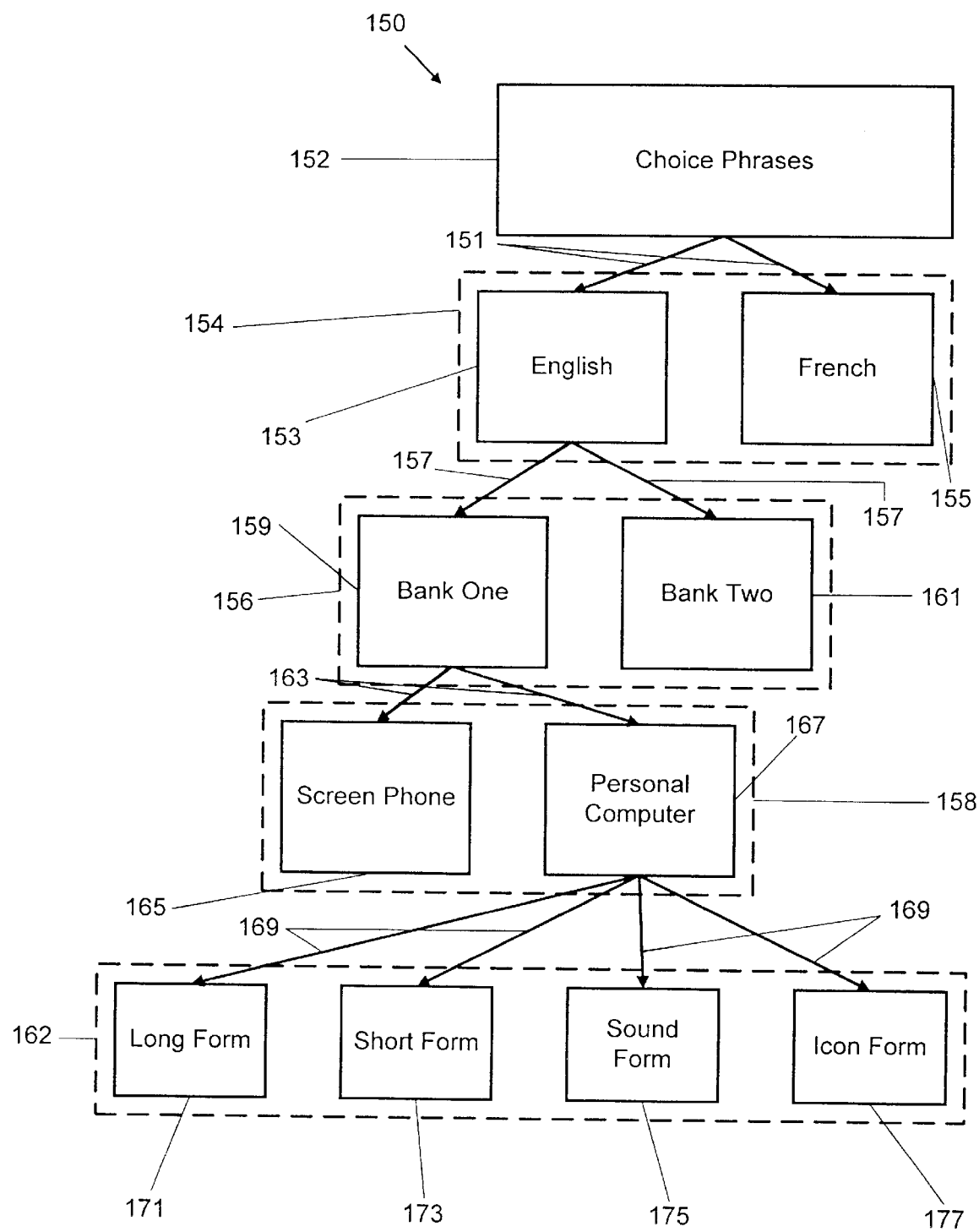

An example of a phrase pack selection 150 is set out in FIG. 8. As depicted, the phrase pack dictionary first receives a request 152 for language type 154. In this example, the request was for a phrase pack in English 153 as opposed to French 155 via connecting lines 151. Next, the phrase pack receives a request for a format of a specific bank type presentation 156. The presentation includes the bank logo, special format and functional features, and other distinguishing screen features. As depicted, the example selection was for bank one 159 over bank two 161. This second step of the selection process is depicted by connected lines 157. The third query presented to the request for a phrase pack is type of customer device 158. As depicted, the selection is between a screen phone 165 and a personal computer 167. The third choice query is depicted by connecting lines 163. The example phrase pack request selected a personal computer as the means by which the phrase pack is to be presented to the user. Finally, the phrase pack request is to select the form 162, via connecting lines 169, of the phrase pack which includes the following: typed on a screen in long form 171; short form 173; presented as spoken word(s) 175; or presented in icon form 177. The phrase pack selection follows the hierarchy for the phrase pack as set out in FIG. 5, with each query satisfying a lower level in the phrase pack hierarchy. By this method, a phrase pack that most satisfies the application streams requirement for presenting information to the customer is satisfied.

The data store 148 on FIG. 7 is a collection of public variables where each variable or array of characters is associated with a unique identifier or tag. In addition, the data set may be accessed by remote agents.

Figure 9:
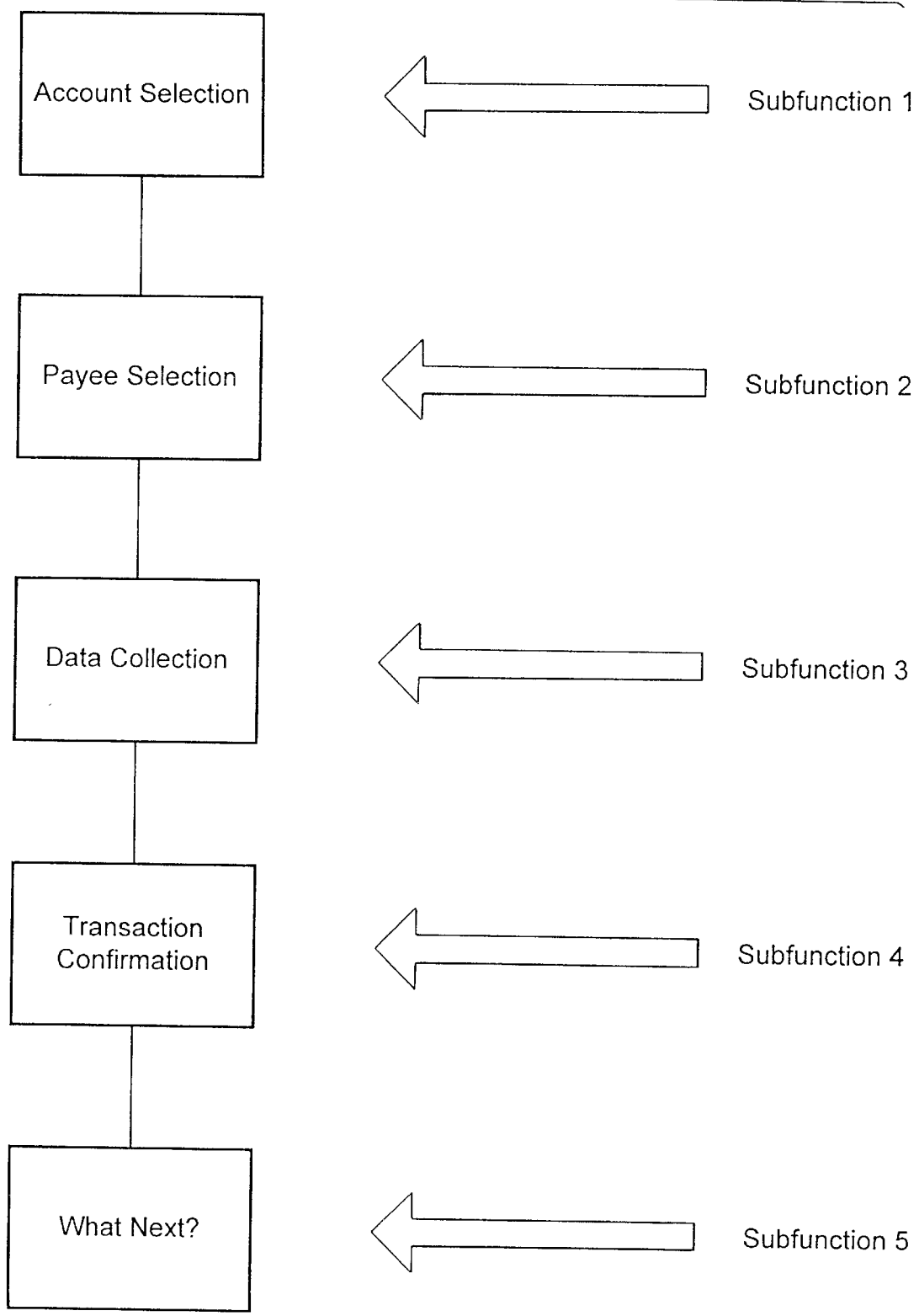

The anatomy of the Direct Access application will now be described with reference to a "Pay" function. Direct Access applications may be composed of a non-linear sequence of routines or subfunctions. The subfunctions form a chain wherein each subfunction in the chain passes, when appropriate, control to the next subfunction in the chain sequence. The highest levels of the subfunctions are identical with all Direct Access applications. A subfunction is composed of one or more procedures grouped to perform a specific task. FIG. 9 depicts a subfunction chain for paying a payee.

As depicted in FIG. 9, the first subfunction entails selection of a customer account to be manipulated. Once the customer has been sufficiently identified through initial communication information, as set out above, an application switch in the token stream is activated to bring about the causation of the second subfunction, payee selection. The customer inputs the payee to receive the funds in question. After the customer inputs the data, the data stream is received by the application, and the second subfunction is satisfied, the third subfunction, data collection, is engaged. In the data collection subfunction, the data necessary to facilitate the money transaction is gathered. This step requirement is application-specific. After completion, the fourth subfunction, transaction confirmation, is enabled. As with the third subfunction, this subfunction is device-specific. When satisfied, the fifth and last subfunction is enabled prompting the customer to engage a second function of the financial institution application.

The chart in FIG. 10 illustrates the combinations of token types that will define an application's user interface. Primary token types may contain secondary tokens that will detail the elements to be presented to the user.

For example, as shown in the matrix on FIG. 10, a SCREEN token may contain a single WINDOW MENU BAR and possibly any of the other token types (GROUP, TEXT FIELD, TABLE, LIST, BUTTON, or IMAGE). That single WINDOW MENU BAR may itself contain one or more WINDOW MENU tokens, which then may contain one or more WINDOW MENU ITEMS. In addition to a token such as the menu bar, a TEXT FIELD token item may be included within the SCREEN token. This TEXT FIELD token could be a statement or paragraph of directions that needs to be presented to the user. A token, such as a TEXT FIELD, may have its display presentation modified by a token item like CENTER, which would attempt to present the contents of the TEXT FIELD token in a centered position on the customer's rendering device. These tokens, when combined in the matrix's allowed groupings, will be used to create the application token stream that will represent the user interface to be generated on the customer's rendering device.

Token attributes are set out in FIGS. 11–15. Token attributes are the computer language elements referring to the location, content, and style of icons, buttons and other elements that appear on the computer monitor screen. These figures include a chart depicting elements that may appear on a computer monitor screen along with locating tags. The locating tags tell the computer where on the screen to place the respective screen element. The charts of FIGS. 11–15 include the following headings of columns: a first column devoted to listing the attributes and tags; a second column labeled "Template"; a third column labeled "Stream"; a fourth column labeled "Full Tag"; a fifth column labeled "Abbreviation"; a sixth column labeled "Default"; a seventh column labeled "Terminated"; and an eighth column labeled "Notes".

The first column sets out the bulk of the attributes and tags addressed by templates utilized by the present invention. The second column sets out the location of the attribute as being within the template. The third column sets out the location of the attribute as being within a stream. The second and third column are not necessarily mutually exclusive. The fourth column sets out the actual language of the element and tag as may appear in the template or stream. The language is intended to be in a form that is comprehensible by computers in use with the present invention. The language instructs the computers where to place elements on screens. The fifth column sets out abbreviations for language set out in the fourth column. The sixth column sets out defaults automatically assigned to values within the actual language if operation of the token attributes does not assign a selected value. The selected value will vary according to the application in use and requirements of the customer. The seventh column sets out the actual language employed to terminate the element assigning language. The eighth column sets out any pertinent notes as may be needed in employing the language set out in the respective row.

The elements addressed by the token attributes include the following: Table Headers, Table Data, Table Rows, Lists, Lists Items, Buttons, Virtual Terminal Windows, Images, Inputs, Status Bars, Forced Line Breaks, Center, Left, Right, Money Format, and Highlight. The use of these tokens and corresponding attributes provides the ability to create a definition of the user interface to be presented to the customer. This defined stream is what will be translated by the token-creator-mapper 26 into a token stream that can be understood by the renderer 22 to display a usable application interface. The displayed interface is therefore generated without the need for the originating financial application to be aware of the customer's device-specific 20 display requirements.

Figure 16:
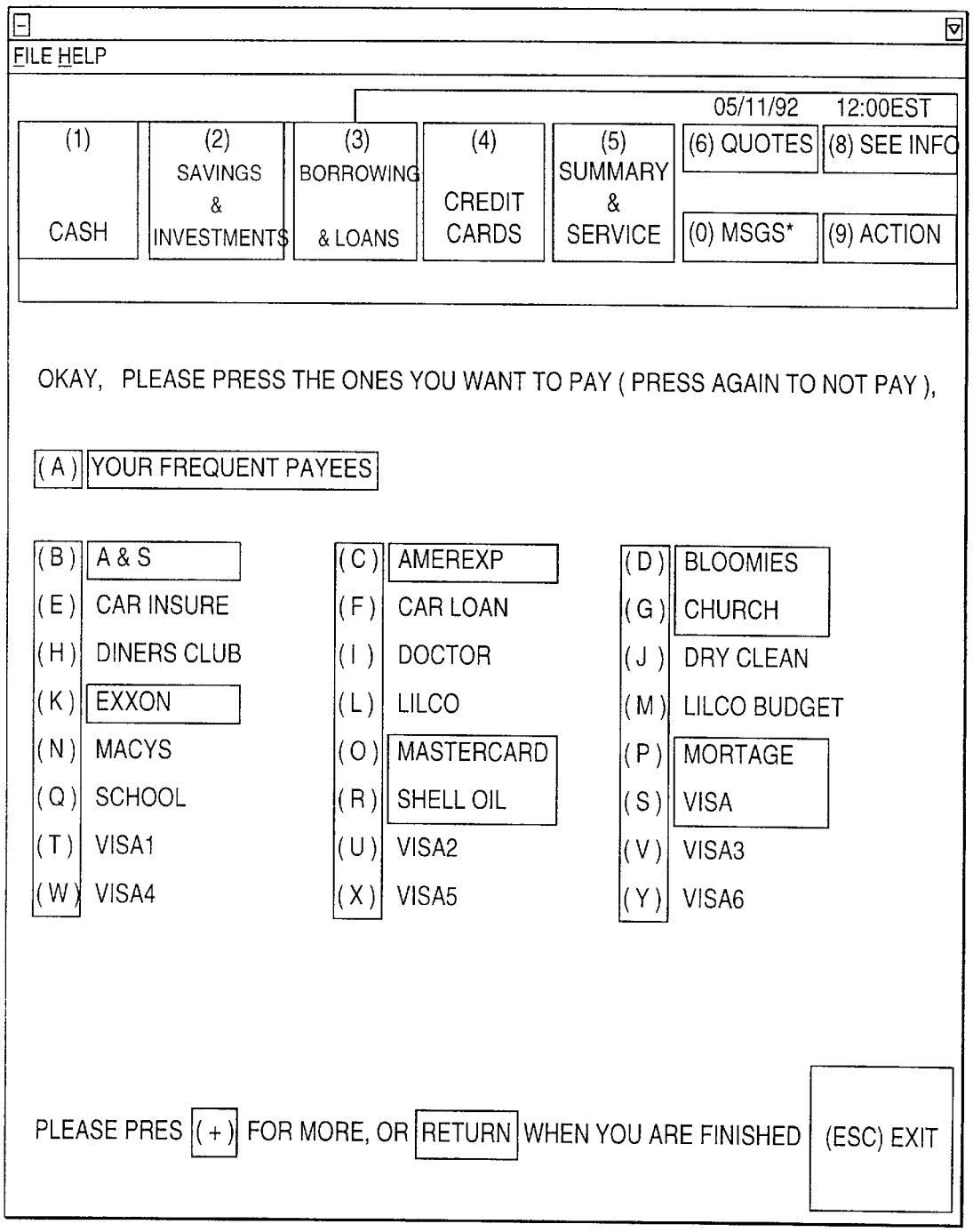
FIG. 16 and 17 depict images as may appear on a computer monitor.
Figure 17:
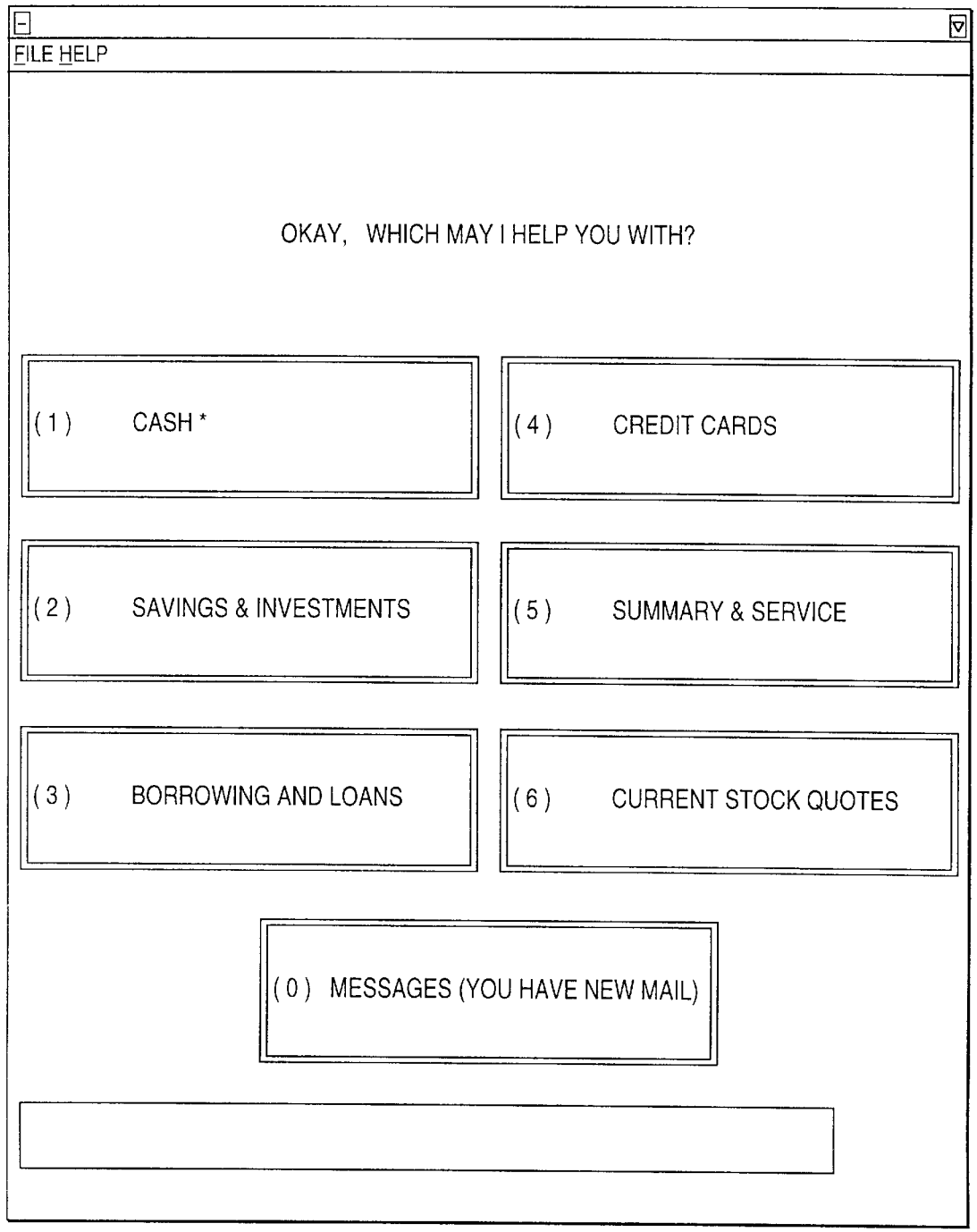

FIGS. 16 and 17 depict images as may actually appear on a computer monitor. Both images include selections for applications that may be activated by the customer. FIG. 16 spaces such selections across the top of the computer monitor screen in a row of buttons, followed by text, then a list of payees to select from. The screen also includes an escape button on the lower right-hand corner of the screen. The selection of payees can be tailored to the individual client's payees and may be selected by a computer mouse, as well as labeling letters. In contrast, FIG. 17 depicts a screen having 7 buttons with descriptive text therein and above and below the buttons. The buttons may be activated by a mouse, as well as labeling numbering. The buttons provide access to different financial institution applications functions.

What is claimed is:

1. A method for facilitating communication between a user using a device with a display and an application program affiliated with a financial institution which the user desires to access through the device comprising the steps of:

receiving information from said device;

identifying the desired program and the type of device being used;

accessing the desired application program, identifying information to be displayed to the user as part of the program and translating the information to be displayed into a format which is compatible with the display of the device;

translating input information inputted by the user in response to the displayed information into a format which is compatible with the application program and forwarding said translated input information to said application program; and translating a response to the input information returned by said program into a format which is compatible with the display of said device and forwarding said translated said response to said device wherein said step of translating the information to be displayed on the device further includes the step of translating the information into a tokenized language which is compatible with both the device and the application program.

2. The method of claim 1 wherein said step of identifying the type of device being used further includes the step of identifying the type of software being used by the device.

3. The method of claim 1 wherein said step of identifying the type of device being used further includes the step of identifying the type of software being used by the device.

4. The method of claim 1 wherein said step of translating the information to be displayed includes the step of automatically determining how to position the information onto the screen so that all the information is displayed.

5. The method of claim 4 wherein said information includes one or more token from the group of prompts, icons, buttons, wording, phrasing, phrase packs, scroll bars, tool bars and scroll lists.

6. The method of claim 1 wherein the step of translating the information into a tokenized language further includes the steps of:

applying a token hierarchy to the information; and creating a token representation of said information, which is compatible with the device.

7. The method of claim 6 wherein said creating step further includes the step of consulting a table of token attributes.

8. The method of claim 1 wherein said application program involves a financial service.

9. The method of claim 8 wherein said financial service is bill payment.

10. The method of claim 8 wherein said financial service is transferring funds between accounts.

11. The method of claim 8 wherein said financial service is buying securities.

12. A method or enabling a plurality of different access devices each having a display to access a plurality of different application programs affiliated with a financial institution comprising the steps of:

identifying the type of access device and associated display and application program to be accessed;

accessing the program and determining the type of information to be shown on the display as part of the program;

applying a token hierarchy to the information;

creating a token representation of said information which is compatible with said display, including the step of consulting a table of token attributes; and sending the token representation to the device.

* * * * *